United States Patent [19]

Fahey

[11] 4,286,019

[45] Aug. 25, 1981

[54] POLYMER SIZING COMPOSITIONS AND METHODS YIELDING SIZED GLASS FIBERS HAVING REDUCED TACKINESS

[75] Inventor: Dennis M. Fahey, Lexington, N.C.

[73] Assignee: PPG Industries, Inc., Pittsburgh, Pa.

[21] Appl. No.: 45,500

[22] Filed: Jun. 4, 1979

[51] Int. Cl.³ .................... C08L 91/00; D02G 3/00
[52] U.S. Cl. .................. 428/391; 260/28.5 B; 260/29.7 E; 260/29.7 H; 260/29.7 NR; 428/392
[58] Field of Search ............... 428/375, 378, 391, 392; 252/8.6, 8.8, 8.9; 260/28.5 B, 29.7 E, 29.7 H, 29.7 NR; 65/3 C; 525/369, 333, 334

[56] References Cited

U.S. PATENT DOCUMENTS

| | | | |
|---|---|---|---|
| 3,065,198 | 11/1962 | Abramo | 260/45.2 |
| 3,116,192 | 12/1963 | Eilerman | 65/3 C |
| 3,168,389 | 2/1965 | Eilerman | 65/3 C |
| 3,361,617 | 1/1968 | Kaizerman . | |
| 3,409,577 | 11/1968 | Wong et al. | 260/29.2 |
| 3,422,038 | 1/1969 | Meyer . | |
| 3,425,895 | 2/1969 | Mertzweiller et al. | 525/334 X |
| 3,484,223 | 12/1969 | Vanderbilt et al. | 65/3 |
| 3,567,671 | 3/1971 | Janetos et al. | 428/288 |
| 3,620,701 | 11/1971 | Janetos et al. | 65/3 C |
| 3,718,449 | 2/1973 | Fahey | 65/3 C |
| 3,743,612 | 7/1973 | Merriam-Vial . | |
| 3,787,224 | 1/1974 | Uffner . | |
| 3,827,230 | 8/1974 | Marzocchi et al. | 260/29.3 X |
| 3,837,892 | 9/1974 | Marzocchi . | |
| 3,837,898 | 9/1974 | McCombs et al. | 428/378 |
| 3,887,347 | 6/1975 | Reese | 65/3 C |
| 3,900,679 | 8/1975 | Marzocchi | 428/378 |
| 3,956,565 | 5/1976 | Bolen et al. | 428/392 |
| 3,958,060 | 5/1976 | Van Gils et al. | 428/261 |
| 3,973,071 | 8/1976 | Fahey | 428/392 X |
| 4,049,597 | 9/1977 | Motsinger | 428/392 X |
| 4,060,658 | 11/1977 | Lin et al. | 428/378 |
| 4,083,834 | 4/1978 | Komatsu et al. | 525/333 X |

*Primary Examiner*—Lorraine T. Kendell
*Attorney, Agent, or Firm*—Kenneth J. Stachel

[57] ABSTRACT

Sized glass fibers are rendered less tacky by treating glass fibers with a sizing composition having a blend of components. The sizing composition has about 0.5 to about 2 weight percent of liquid hydroxylated styrene butadiene copolymer, about 0.35 to about 2 weight percent of one or more emulsifiers, about 0.5 to about 1.5 weight percent of a wet lubricant, about 0.5 to about 3 weight percent of one or more dry lubricant oils or waxes and about 0.3 to about 2 weight percent of an organo silane coupling agent. All of the weight percents are of the total aqueous sizing composition. The emulsifier or emulsifiers are those having a fatty acid portion with carbon to carbon chain lengths of at least 14 to about 20 carbon atoms. The wet lubricant has a nitrogenous group to provide hydrogen bonding with the surface of the glass fibers.

9 Claims, No Drawings

POLYMER SIZING COMPOSITIONS AND METHODS YIELDING SIZED GLASS FIBERS HAVING REDUCED TACKINESS

The present invention relates to polymeric sizing compositions and methods for producing fibrous materials that have reduced tackiness without the use of commercially known detackifying agents that are used to reinforce elastomeric materials.

In producing glass fibers for use as reinforcement for elastomeric materials, the fibers are contacted with a sizing composition that will protect the fibers after they are gathered together from interfilament abrasion and that will make the glass fibers compatible with the elastomeric material. The sizing composition is usually applied to the glass fibers as they are formed by the rapid attenuation from molten cones of glass at the tips of small orifices in a bushing. An example of such an operation is disclosed by U.S. Pat. No. 2,133,238.

The sizing composition performs its duel roles of providing both protection and compatibility by having one or more components that alone or in combination produce the desired effect. The basic components include a film former or binder, a lubricant, coupling agent, and possible other additives like flexibilizing agents, wetting agents, stabilizing agents, plasticizers, and emulsifying agents and the like. The components present in the sizing composition that perform the function of providing the compatibility between the glass fibers and the elastomeric material usually are the binder and the coupling agent. The binders include such compounds as starch-oil compositions, butadiene styrene copolymers, butadiene homopolymers, butyl rubber, and polyurethane prepolymer prepared by reaction of polyisocyanate with a hydroxyl terminated polybutadiene, and the like.

The use of polybutadiene homopolymer as a binding in a sizing composition for elastomer materials is disclosed in U.S. Pat. No. 3,837,898. In this sizing composition the polybutadiene is used as an emulsion which can be prepared by dissolving polybutadiene rubber in a solvent and then emulsifying the resulting solution with water and an emulsifier. It is preferred to use a liquid polybutadiene homopolymer having an average molecular weight of 500 to 5000. It is also disclosed that use can be made of functionally terminated low-molecular weight polymers such as hydroxy, carboxy, nitrile etc. terminated butadiene polymers. Also it is disclosed in U.S. Pat. No. 3,484,223 (Vanderbilt et al) to size glass fibers with a carrier medium having 1 to 10 percent of a solid non-blocking saturated copolymer of a vinylic aromatic, a C-4 to C-8 diolefin having at least 50 percent 1,2 or 3,4 type unsaturation wherein the average molecular weight is about 1000 to 30,000 and a hydrolyzable silane.

The coupling agents usually used in sizing compositions for glass fibers that are to be used as reinforcement for elastomeric products are organo silanes. In U.S. Pat. No. 3,837,892 (Marzocchi) it is suggested to use a functional organo silicon compound containing at least one of an amino, a hydroxy, or an epoxy group to treat glass fibers to improve the bonding relationship between glass fibers and elastomeric materials. After the glass fibers are treated with the functional organo silicon compound, the glass fibers are treated either with polyurethane prepolymer containing three isocyanates or an organic polyisocyanate or a polyurethane prepolymer or a polyhydroxylated compound. The polyurethane prepolymer containing three isocyanate groups may be prepared by reaction of excess polyisocyanate with a hydroxyl terminated polybutadiene or a polyhydroxylated polyester.

One difficulty that arises when using sizing compositions containing the aforementioned binders, particularly the butadiene type binders is the handling or processing difficulties created due to the tackiness of the sized glass fibers. This tackiness is engendered from the binder and leads to the handling and processing difficulties that arise during various production operations. For example, such operations include the removal of a dried wound package of fibers, the chopping of glass fibers in the form of strands for use in reinforcement, and the processing of strands in a manner that entails the contact of the tacky surface glass fibers with contact points such as guide eyes, rollers, chopping blades and the like. The tack problem in such operations would reduce the efficiency of the glass fibers reaching a common destination in a satisfactory condition. The tackiness would lead to build-up on the passages, contact points and guide eyes, thereby increasing the frequency of breakage and the fuzziness of the glass fibers. Such problems are particularly annoying and disruptive of process efficiencies when the glass fibers in the form of strands have been wound onto numerous forming packages and these packages are placed on a creel so that the glass fiber strands can be removed from the packages and passed over the contact points, guide eyes and the like to a common destination for coating by a latex adhesive dip to produce coated glass fiber strand useful in the reinforcement of elastomeric materials.

The art has reduced the amount of tack for glass fiber strands treated with sizing compositions containing the tack producing binders by incorporating fillers, antiblocking agents and detackifiers into the sizing composition. The addition of such agents to a sizing composition is not without accompanying disadvantages. Disadvantages that can result include diminished protective capability supplied by the sizing composition for the glass fibers, increased susceptibility of the glass fibers to moisture absorption, and increased dryability and stiffness of the glass fiber strands. Such disadvantages would decrease the effectiveness of the glass fiber strands as reinforcement for elastomeric materials.

Another approach to reducing the tack of tacky resins used in the sizing compositions for glass fibers was proposed in U.S. Pat. No. 3,409,577 (Wong et al). This approach was to use a detackifying agent which was believed to have one end which was non-tacky by reason of a particular type of detackifying group. The detackifier adhered to the surface the tacky materials in an oriented manner with the non-tacky group projecting from and covering the surface of the normal tacky materials. The type of detackifying agents useful in this approach were those having the following formula:

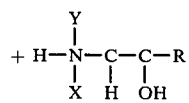

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH and (3) —(OR")$_n$OH wherein R" is an aliphatic hydrocarbon radical having a chain length of from 1 to 6 carbon atoms and n is an integer of from 1 to 25 and R is a long chain organo molecule having a molecular weight up to approximately 10,000 and devoid of the terminal group given above at its other end. Such materials may be made by acidifying the reaction product of a suitable amine with a molecule having at least one oxirane group thereon. Where oxirane groups exist at both ends of the molecule the reaction with the amine must be carried out under conditions that assure that only one oxirane group of each molecule is reacted with the amine.

It is an object of the present invention to provide a sizing composition for producing sized glass fibers useful in reinforcing elastomeric materials wherein the glass fibers have reduced tackiness but wherein the disadvantages of using detackifying agents in the sizing composition is avoided.

It is an additional object of the present invention to provide sized glass fiber strands that have reduced tackiness, but maintain good properties of adhesion, have easy removal from forming packages, have little fuzz or ringers and have good physical properties for the reinforcement of elastomeric materials like natural and synthetic rubber.

It is a further additional object of the present invention to provide a sizing composition for treating glass fibers that yield treated glass fibers capable of better penetration and better encapsulation when coated with an elastomeric coating to produce elastomeric coated cord.

SUMMARY OF THE INVENTION

The aforementioned objects and other objects are accomplished in accordance with this invention by production of glass fiber strands having reduced tackiness for use in reinforcing elastomeric materials by treating the glass fibers before they are gathered into strands with a liquid sizing composition having a blend of low molecular weight styrene butadiene copolymer and/or hydroxyl derivatives thereof, wet lubricants, dry lubricants and emulsifiers. The sizing composition that is an aqueous liquid blend has critical amounts, expressed in weight percent of the sizing composition, of specific binders, emulsifiers, wet lubricants, and dry lubricants. The binder present in the blend in an amount of about 0.5 to about 2 weight percent is a liquid styrene butadiene copolymer or hydroxyl derivative thereof having a molecular weight in the range of about 50 to 5,000. The blend also has about 0.35 to about 2 weight percent of one or more emulsifying agents that have a fatty acid portion with a carbon to carbon chain with at least 14 carbon atoms. The blend also has about 0.5 to about 1.5 weight percent of a wet lubricant that has a nitrogenous group to provide hydrogen bonding with the surface of the glass fibers. The blend also has about 0.5 to about 3 weight percent of one or more dry lubricants that are oil-type or wax-type lubricants. Also, the blend contains about 0.3 to about 2 weight percent of an organo silane coupling agent.

With the use of this aqueous liquid blend as the sizing composition for treating glass fibers, the glass fiber strands that are produced have reduced tackiness but still have good properties of integrity and compatibility with elastomeric latices that may be used in a coating composition for treating the sized glass fibers to produce coated glass fiber strands useful in reinforcing elastomeric materials.

DETAILED DESCRIPTION OF THE INVENTION

Sizing compositions for treating glass fibers that contain binders that are compatible with elastomeric latices, such as, binders like styrene-butadiene copolymer and/or hydroxyl derivatives thereof, lead to a sized glass fiber strand that is tacky to such a degree that the tackiness impedes the processing of the sized glass fiber strand. It would be desirable to reduce the amount of tack in the sized glass fiber strand without reducing the glass fiber strand properties of integrity and compatibility with elastomeric latices that are used in coating compositions for treating the sized glass fiber in producing coated glass fiber cord. It is also desirable that the reduction of tackiness does not interfere with the diffusion and penetration and homogeneity of any elastomeric latex-containing coating used with the sized glass fiber strands. By using the proper amounts of the specific types of emulsifiers, dry lubricants, wet lubricants, the tack of a binder, such as styrene-butadiene copolymer and/or hydroxyl derivatives thereof, can be reduced without decreasing the properties of integrity, and compatibility of the glass fiber strands with a coating composition containing elastomeric latices and without interfering with the diffusion and penetration and homogeneity of the coating composition with the sized glass fibers. It is believed, but the composition, articles, and process of the present invention are not limited by this belief, that the specific type of emulsifiers function as both detackifiers and dry lubricants and that the proper amounts of the emulsifiers in a blend of liquid stryene-butadiene copolymer or hydroxyl derivative thereof, wet lubricant and dry lubricant and coupling agent provide better emulsification and increased amounts of dry lubricant in the blend.

The use of styrene-butadiene copolymer and/or hydroxyl derivatives thereof as a binder in a sizing composition provides added integrity and better compatibility with elastomeric latices present in coating compositions for the sized glass fiber strands than do the homopolymers of butadiene. The use of a styrene-butadiene copolymer or hydroxyl derivatives thereof is accompanied with the problem of tackiness but because of the better integrity and better compatibility with elastomeric latices, especially with the liquid styrene butadiene copolymers or hydroxyl derivatives thereof, it is desired to use these copolymers with some system for detackifying these copolymers. It is preferred to use the hydroxy derivative of the styrene-butadiene copolymer such as that produced by Arco polymers under the trade designation POLYbd CS-15 which is a hydroxyl-terminated butadiene styrene copolymer. This styrene butadiene copolymer has about 75 weight percent butadiene and 25 weight percent styrene with a viscosity at 30° C. of about 150 poise. The hydroxyl value in milliequivalents (meq) per gram (gm) and the hydroxyl number in milligrams of KOH per gram are 0.65 and 36.5 respectively. The approximate molecular weight of the copolymer is around 3400 and the moisture in weight percent is about 0.05 while the specific gravity at 30° C. is 0.924. The hydroxylated styrene butadiene copolymer has the formula:

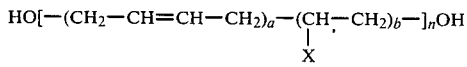

wherein X is a benzene ring and a is equal to 0.75, b is equal to 0.25 and n is equal to 54. The degree of polymerization is in the range of 50, the poly-butadiene microstructure is similar to that of polybutadiene and SBR copolymers prepared by emulsion polymerization. The predominant configuration is TRANS-1,4 (60%) with approximately 20 percent each CIS-1,4 and Vinyl-1,2. The terminal hydroxyl groups are primary and predominantly of the allylic type. The hydroxyl functionality of the copolymer is approximately 2.1 to 2.3.

The liquid hydroxylated derivative styrene butadiene copolymer is used as an emulsion. The emulsion can be prepared by dissolving the hydroxylated styrene butadiene copolymer in a solvent and then emulsifying the resulting solution with water and an emulsifier. It is preferred to use an aqueous emulsion formed by vigorous mixing of the hydroxylated derivative of the styrene butadiene copolymer with water in the presence of the proper amount of the emulsifiers of the present invention. The mixing is contiinued until the initial water and oil emulsion inverts to form a stable emulsion of liquid hydroxylated derivative of styrene butadiene copolymer in aqueous medium. The wet lubricants and dry lubricants and coupling agents to be added into the blend to make the sizing composition of the present invention can be added after the inversion to form a stable emulsion or before the inversion. Generally the hydroxyl-terminated styrene butadiene copolymer can have an average molecular weight of 500 to 5,000 and preferably 700 to 4,000.

The emulsifiers used in the blend of the present invention are those that have a capability of acting as an emulsifier, a detackifier and a dry lubricant. This type of emulsifying agent is a non-ionic polyoxyethylene derivative of fatty acid partial esters of sorbitol anhydrides or the polyoxyethylene derivatives of fatty alcohols, polyoxyethylated vegetable oil and polyoxyethylated stearates, where the fatty acid portion of all of these compounds has a carbon chain having at least 14 carbon atoms and preferably 14 to 20 carbons in a linear arrangement such as oleate, stearate, and laurates. Such emulsifiers are commercially available and for example, include "TWEEN 81", "TWEEN 21" and Atlas G-1471, available from Atlas Chemical Industries, Inc.; MYRJ-52 available from ICI America, Inc. and EMULPHOR 719 available from GAF Corporation, Chemical Products. The most preferred emulsifiers will have a hydrophilic lipophylic balance of around 14 to about 15. The proper amount of one or a mixture of these emulsifiers is in the range of 0.35 to about 2 weight percent of the sizing composition. Use of less than an amount in this range would not substantially reduce the tackiness of the sized glass fiber strand. This latter amount is generally about one-fifteenth the amount of hydroxyl-terminated styrene butadiene copolymer used in the blend. Use of amounts of emulsifiers in excess of this proper range will lead to reduced bonding by the film former with resultant sloughing and unusable soft forming packages of glass fiber strand.

The wet lubricant that is used in the blend of the present invention is defined as a lubricant that performs its function in contact with the glass fibers while the glass fibers are wet. Generally this type of lubricant is a water soluble cationic lubricant containing a nitrogenous group to provide for hydrogen bonding between the glass fibers and the lubricant. The cationic lubricant is used in an amount from about 0.5 to 1.5 percent by weight and preferably from about 0.75 to about 1.5 percent by weight based on the total ingredients of the sizing composition including water. If amounts less than those stated in the range are used, there will not be sufficient amounts of cationic lubricant to impart slip to the exterior of the glass fiber strand as it passes over various types of processing equipment. Amounts in excess of those stated in the range should be avoided because of economic reasons and also because these amounts would lead to too much moisture susceptibility in the sizing composition. Examples of cationic lubricants that can be used in the blend of the present invention that constitutes the sizing composition for treating glass fibers include the polyamide resin available under the product designation "VERSAMID 140" having an amine value of 370 to 400 from General Mills; and the amadated polyamine available under the product designation "EMERY 6717" available from Emery Industries; and the alkyl imidazoline reaction product of tetraethylene pentamine and stearic acid available under the product designation "CATION X". The above cationic lubricants can be used alone or in combination. It is preferred to use a mixture of the VERSAMID 140 and EMERY lube cationic lubricants in the blend of the present invention.

The dry lubricant is one or more non-ionic water insoluble or soluble lubricants that lubricate the glass fiber strand when the strand is in a dry condition. The lubricant is typically a hydrogenated or saturated fatty acid ester of glycerol. Fatty acid such as those fatty acids hereinbefore recited having 4 to 18 carbon atoms and in all cases an even number of carbon atoms per molecule may be used. Other lubricants that may be used include lubricating oils containing some aromaticity and compatibility with rubber such as vegetable-type oils that are known to be used as lubricating oils in sizing compositions for treating glass fibers. Another type of lubricant that can be used is microcrystalline-type waxes having a melting point of about 100° F. or more, preferably above 135° F. and in the form of a water dispersion wherein the percent by weight of wax is in the range of 40 to 60 and preferably 50 to 60. Examples of commercially available, non-ionic, water insoluble lubricants that can be used include the microcrystalline wax emulsion available from Mobil Oil Company under the product designation "MOBILCER Q" and the partially hydrogenated corn oil known as "Puerco Oil" from Capital City Products. Water soluble lubricants that can be used are polyoxyethylene glycols available under the produce designation "CARBOWAX 300" or "CARBOWAX 1000." One non-ionic lubricant can be used in the blend of the present invention or a combination or mixture of several non-ionic lubricants can be used. It is preferred to use a mixture of the non-ionic lubricants such as the MOBILCER Q wax emulsion and a CARBOWAX 300 wax. The amount of dry lubricant or non-ionic lubricant used in the blend of the present invention that constitutes a sizing composition for treating glass fibers is in the range of about 0.5 to about 3 weight percent of the sizing composition. If amounts of the non-ionic lubricant that are below or above those ranges stated above are used in the blend of the present invention, the sized glass fiber strand produced will not have a sufficient concentration of nonionic lubricant or there will be too much lubricant in the proximity of the glass-silane-elastomer bond to produce a well-bonded coated glass fiber cord when the sized strand is coated with an elastomeric-containing coating, for use in reinforcing elastomeric materials.

The coupling agent used in the blend of the present invention is an organo silane containing 1 to 3 readily hydrolyzable groups, such as halogen (bromine, chlorine, fluorine, or iodine) or alkoxy having 1 to 6 carbon atoms such as methoxy, ethoxy, propoxy, butoxy, etc. and containing at least one organic group attached directly to the silicon atom with other positions on the silicon atom being occupied by hydrogen. The organic group or groups attached to the silicon atom can vary from a number of different organic groups including vinyl, alkyl, beta chloropropyl, phenyl, thio-alkyl, thio-alkaryl, amino-alkyl, methacrylato, epoxy, and mercapto groups. Monoamino and diamino silanes have been found particularly suitable in the blend of the present invention that constitutes the sizing composition. Thus, gamma-amino-propyl triethoxy silane, and N-(trimethoxy silylpropyl)ethane diamine acrylamide and other similar mono and diamino silanes may be used with the preferred silane being the gamma aminopropyltriethoxysilane. The silanes are employed in concentrations ranging from about 0.30 to about 2.0 percent by weight based on the aqueous size mixture and, preferably, between 0.5 to 1 percent by weight based on the aqueous size mixture.

The blend that constitutes the sizing composition of the present invention can contain other conventional sizing ingredients such as fungicides like tributyltin oxides, wetting agents, and softening agents.

The total solids content, i.e., copolymer content, of the blend that constitutes the sizing composition of the present invention is about 1 to 10, preferably about 2 to about 5 and most preferably about 3 to about 4.5 percent by weight of the emulsion. In all events, the amounts of the various ingredients should not exceed the amount which will cause the viscosity of the sizing composition to be greater than about 100 centipoises at 20° C. Sizing compositions having a viscosity of greater than 100 centipoises at 20° C. are very difficult to apply on glass fiber strands during their formation without breaking strands. It is preferred that the viscosity of the sizing composition be between 1 and 20 centipoises at 20° C. for best results. It is desired to deposit from about 0.2 to 5, preferably 0.5 to 2 weight percent of sizing solids on the glass, based on the weight of the glass. The invention is further illustrated by the following illustrative example and the following examples.

Illustrative Example

A sizing formulation is prepared having the following constituents:

| | | (Wt. % of Composition) |
|---|---|---|
| Hydroxyl terminated styrene-butadiene copolymer (Arco Poly bd-CS-15) | 60 grams | .53 |
| POE (4) sorbitan mono-laurate (Tween 21) (emulsifier) | 20 grams | .18 |
| Nonionic POE Vegetable Oil (Emulphor EL-719) (emulsifier) | 10 grams | .09 |
| Hot water | 300 grams | |
| Hot water | 300 grams | |
| Partially amidated polyamine (Cationic lubricant) (Emery Lube 6717) | 50 grams | .44 |
| Water | 2000 grams | |
| Polyethylene glycol (Carbowax 300) (nonionic water soluble lubricant) | 100 grams | .87 |
| Wax emulsion (Mobilcer Q) nonionic water insoluble lubricant | 50 grams | .44 |
| Water | 1000 grams | |
| Gamma-aminopropyltriethoxy-silane (coupling agent) (A-1100) | 60 grams | .53 |
| Percent solids | | 4.0 |

The sizing composition was prepared by emulsifying the copolymer with POE (4) sorbitan mono-laurate and POE vegetable oil in the 300 grams of hot water. The emulsion was combined with a mixture of the cationic lubricant in water and a mixture of the two nonionic lubricants in water and a mixture of the coupling agent in water. The combined blend was diluted with water to 11,400 grams.

The sizing composition was applied to K glass fibers in the usual manner to form sized glass fiber strand. The sized strand was dried at 270° F. (132° C.) for 8 hours.

The sized glass fiber strands were coated with an elastomeric coating to produce elastomeric coated cord. The cord had a few streaks and spots with surface spots and fuzz and was rated poor.

In contrast to the cord produced in the Illustrative Example, the cords produced in the same manner from sized glass fiber strand using the blends of the present invention as shown in Table I below gave good ratings.

TABLE I

| Component | Blend Sizing Formulations | | | | |
|---|---|---|---|---|---|
| | Blend-1 Wt % Comp. | Blend-2 Wt % Comp. | Blend-3 Wt % Comp. | Blend-4 Wt % Comp. | Blend-5 Wt % Comp. |
| Hydroxyl terminated styrene butadiene copolymer (Arco Poly bd C-S-15) | 0.99 | 0.95 | 0.99 | 1.6 | 1.3 |
| EMULSIFIERS | | | | | |
| Polyoxyethylene (POE) (5) sorbitan monooleate (Tween 81) | .16 | | .44 | .25 | .5 |
| POE (4) sorbitan mono-luarate (Tween 21) | .66 | | .44 | 1.1 | — |
| Nonionic POE Vegetable Oil (Emulphor EL-719) | .16 | — | | .25 | — |
| Nonionic POE sorbital lanoline derivative (Atlas G1471) | | .38 | — | — | — |
| Ethoxylated Fatty Acid | | | | | |

TABLE I-continued

| Component | Blend Sizing Formulations | | | | |
|---|---|---|---|---|---|
| | Blend-1 Wt % Comp. | Blend-2 Wt % Comp. | Blend-3 Wt % Comp. | Blend-4 Wt % Comp. | Blend-5 Wt % Comp. |
| (Myrj-52) | — | — | — | — | .5 |
| Hot Water (gm) | 1000 gm. | 1000 | 300 | — | — |
| Hot Water (gm) | 2000 gm. | 2000 | 600 | — | — |
| CATIONIC LUBRICANT | | | | | |
| Polyaminofunctional polyamide resin (amine value 370–400) (Versamid 140) | .53 | .51 | .53 | .85 | .7 |
| Partially amidated polyamine (Emery Lube 6717) | .32 | .31 | .32 | .52 | .4 |
| Water | — | — | — | — | — |
| Water | — | — | — | — | — |
| NONIONIC WATER INSOLUBLE LUBRICANT | | | | | |
| Polyethylene glycol | | | | | |
| (Carbowax 300) | .66 | .64 | .66 | 1.1 | — |
| (Carbowax 1000) | — | — | — | — | .87 |
| Wax Emulsion (Mobilcer Q) | .33 | .32 | .35 | .53 | .61 |
| Water (gm) | 5000 | 3000 | 4000 | — | — |
| COUPLING AGENT | | | | | |
| Silane (gamma-aminopropyl triethoxy silane) | .66 | .64 | .35 | 1.1 | .87 |
| SAG-470 (silicon defoamer) | — | — | — | .01 | .01 |
| diluted with water | 10 gal. (37.85 L) | 11,400 gm. (37.85 L) | 11,400 gm. | 10 gal. (37.85L) | 10 gal. (37.85L) |
| Percent Solids | 10 gal. | 5.5% | 4% | 6% | 5% |

The sizing composition depicted in Table I as blends were used to treat K glass fibers and coated with an elastomeric-coating composition in the same manner as mentioned above for the Illustrative Example.

To show the improvement of coated glass fibers that were treated with the sizing compositions of Table I as opposed to the sizing composition of the Illustrative Example attention is directed to Table II.

TABLE II

| | Steaks, Spots | Cord Fuzz | Rated | Comment |
|---|---|---|---|---|
| Coated Glass Fiber Samples Treated with Indicated Sizing Composition | | | | |
| Coated Glass Fibers Size-Illustrative Eg | Some | Yes | Poor | Fuzz |
| Coated Glass Fiber-Size Blend #1 | — | Little Fuzz | — | Good |
| Coated Glass Fibers Size-Blend #2 | — | Very Little Fuzz | 9 | Looked Good |
| Coated Glass Fibers Size-Blend #3 | — | — | 9 | — |
| Coated Glass Fibers Size-Blend #4 | Little Spots | Some Fuzz | 8 | — |
| Coated Glass Fibers Size Blend #5 | Many Spots | Little Fuzz | 9 | — |

Rating on a scale of 1 (poor) to 10 (excellent).

The results of Table II show the advantage of using the sizing composition of the present invention where the reduction of fuzz indicates the reduction of tackiness of the sized glass fibers as they were being coated.

The foregoing has described an emulsion blend to be used as a sizing composition for glass fibers to produce sized glass fiber strands that can be coated with an elastomeric-containing latex, rubber-like coating to produce glass fiber cord for use in reinforcing elastomeric materials wherein the sized glass fiber strands have reduced tackiness because of the components and their amounts in the blend. The glass fiber strands sized with the blend of the present invention has reduced tackiness while maintaining good properties of integrity and compatibility for association with the elastomeric coating material to yield coated cord that has good properties in reinforcing elastomeric materials.

I claim:

1. An aqueous sizing composition for glass fibers that produces sized glass fibers for use in reinforcing elastomeric materials wherein the sized glass fibers have reduced tackiness but still permit good adhesion between the sized glass fibers and the reinforced elastomeric materials, comprising in weight percent of the aqueous sizing composition:
   (a) about 0.5 to about 2 percent of liquid hydroxyl terminated styrene butadiene copolymer having a molecular weight weight in the range of 500–5000,
   (b) about 0.30 to about 2.0 percent of an organo silane coupling agent, and
   (c) a system for minimizing the tackiness of the liquid hydroxyl terminated styrene-butadiene copolymer, comprising:
      (1) about 0.35 to about 2 percent of one or more non-ionic emulsifying agents having a fatty acid portion with carbon to carbon bonds of at least C-14 to C-20,
      (2) about 0.5 to about 1.5 percent of a wet lubricant that has a nitrogeneous group to provide hydrogen bonding with the surface of the glass, and
      (3) about 0.5 to about 3 percent of one or more dry lubricant oils or wax lubricants, and
   (d) the remaining amount percent of the sizing composition being water.

2. The sizing composition of claim 1 wherein the 0.5 to about 2 weight percent of the emulsifiers is a mixture of polyoxyethylene (POE) 5 sorbitan monooleate and POE (4) sorbitan mono-laurate and POE vegetable oil.

3. The sizing composition of claim 1 wherein the 0.5 to about 1.5 weight percent of wet lubricant is a mixture of polyamino functional polyamide resin with an amine value of 370 to 400 and partially amidated polyamine.

4. The sizing composition of claim 1 wherein the dry lubricant is a mixture of polyethylene glycol and wax emulsion.

5. The sizing composition of claim 1 wherein the organo silane is gamma-aminopropyltriethoxy silane.

6. The sizing composition of claim 1 wherein a silicone defoaming agent is present with a reduced remaining amount of water.

7. Glass fibers sized with the sizing composition of claim 1.

8. The aqueous sizing composition of claim 1 wherein the liquid hydroxyl terminated styrene-butadiene copolymer has the formula:

$$HO-[(CH_2-CH=CH-CH_2)_a-(CH-CH_2)_b]_n-OH$$
$$\phantom{HO-[(CH_2-CH=CH-CH_2)_a-(CH}|\phantom{}$$
$$\phantom{HO-[(CH_2-CH=CH-CH_2)_a-(CH}X$$

wherein X is a benzene ring and a is equal to 0.75 and b is equal to 0.25 and n is equal to 54 and the degree of polymerization is in the range of about 50.

9. Sizing composition of claim 1 wherein the one or more nonionic emulsifying agents have an HLB in the range of around 14 to about 15.

* * * * *

UNITED STATES PATENT AND TRADEMARK OFFICE
CERTIFICATE OF CORRECTION

PATENT NO. : 4,286,019
DATED : August 25, 1981
INVENTOR(S) : Dennis M. Fahey

It is certified that error appears in the above—identified patent and that said Letters Patent are hereby corrected as shown below:

Column 10, line 41, delete "weight" (second occurrence).

Column 10, line 56, after the word "amount", add the terms 'in weight'.

Signed and Sealed this

Fifteenth Day of December 1981

[SEAL]

Attest:

GERALD J. MOSSINGHOFF

Attesting Officer

Commissioner of Patents and Trademarks